(12) United States Patent
Ito et al.

(10) Patent No.: US 9,902,350 B2
(45) Date of Patent: Feb. 27, 2018

(54) VEHICLE FRONT PORTION STRUCTURE

(71) Applicant: TOYOTA JIDOSHA KABUSHIKI KAISHA, Toyota (JP)

(72) Inventors: Keita Ito, Tougou-cho (JP); Yuji Takahashi, Nissin (JP); Yusuke Hayashi, Okazaki (JP); Yoshitaka Sotoyama, Nissin (JP); Yousuke Matsumoto, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/240,338

(22) Filed: Aug. 18, 2016

(65) Prior Publication Data

US 2017/0066395 A1    Mar. 9, 2017

(30) Foreign Application Priority Data

Sep. 8, 2015 (JP) ................. 2015-176707

(51) Int. Cl.
  *B60R 19/04* (2006.01)
  *B60R 19/18* (2006.01)
  *B62D 21/15* (2006.01)

(52) U.S. Cl.
  CPC .............. *B60R 19/04* (2013.01); *B60R 19/18* (2013.01); *B60R 2019/186* (2013.01); *B62D 21/152* (2013.01)

(58) Field of Classification Search
  CPC ....... B60R 19/02; B60R 19/023; B60R 19/04; B62D 21/15; B62D 21/152
  USPC ..... 296/187.09, 187.1, 203.02; 293/132, 133
  See application file for complete search history.

(56) References Cited

U.S. PATENT DOCUMENTS

| | | | |
|---|---|---|---|
| 9,517,799 B2 * | 12/2016 | Matsumoto | B62D 25/08 |
| 2014/0091585 A1 * | 4/2014 | Ramoutar | B60R 19/24 |
| | | | 293/133 |
| 2016/0101751 A1 * | 4/2016 | Bou | B62D 21/152 |
| | | | 293/133 |

FOREIGN PATENT DOCUMENTS

JP    2012-62017    3/2012

* cited by examiner

*Primary Examiner* — Jason S Daniels

(74) *Attorney, Agent, or Firm* — Oblon, McClelland, Maier & Neustadt, L.L.P.

(57) ABSTRACT

An upper and lower pair of first beads that extend in a longitudinal direction are formed at an inner side wall of a front side spacer. The first beads project to the vehicle width direction outer side. Therefore, when a collision load diagonally to the rear-left side is inputted to a front end portion of the inner side wall, the first beads act to support the inner side wall adjacent above and below the first beads from the vehicle width direction outer side. Accordingly, tilting deformation of the inner side wall toward the vehicle width direction outer side at the beginning of a micro-wrap collision of a vehicle is suppressed. An overall dimension in the vertical direction of the general portions of the inner side wall is specified to be greater than an overall dimension in the vertical direction of the first beads.

7 Claims, 9 Drawing Sheets

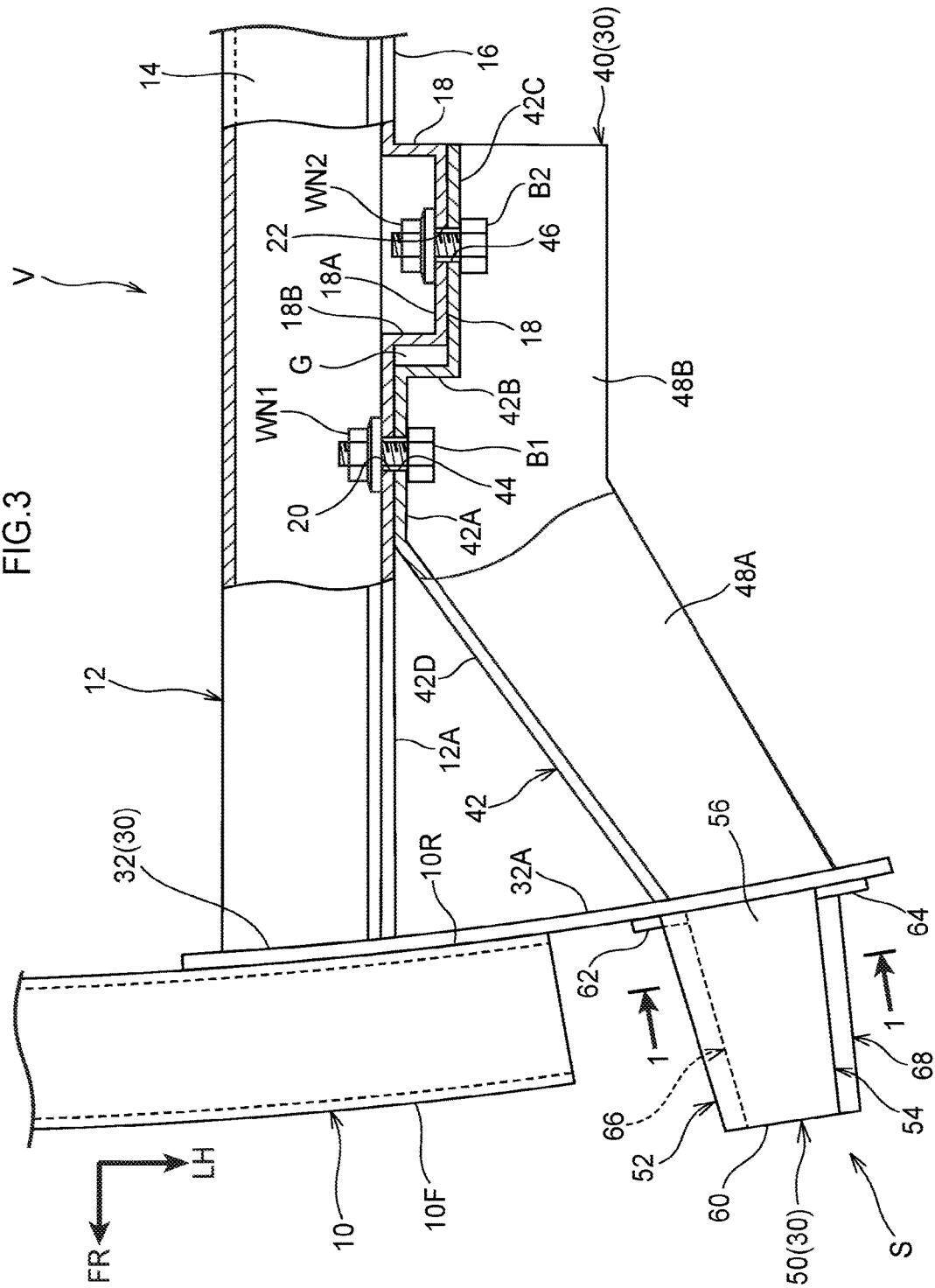

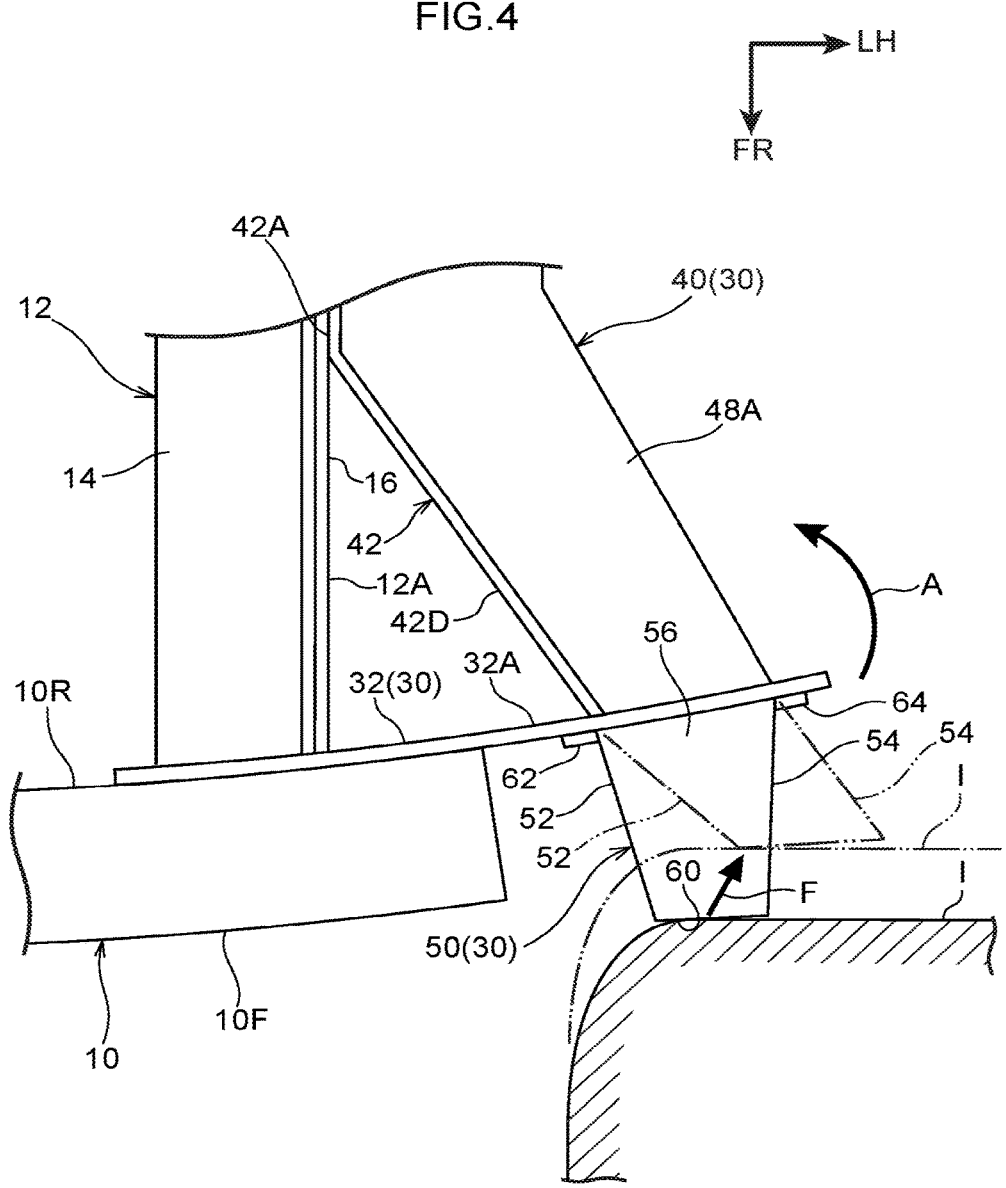

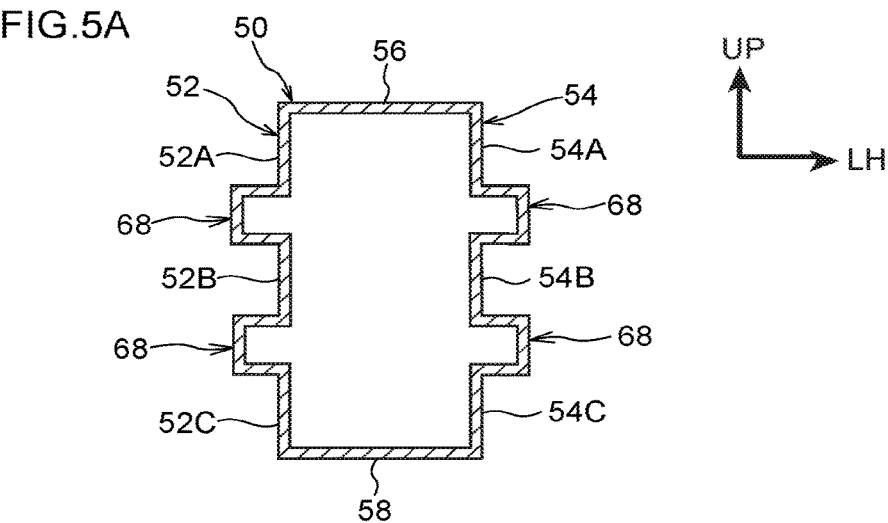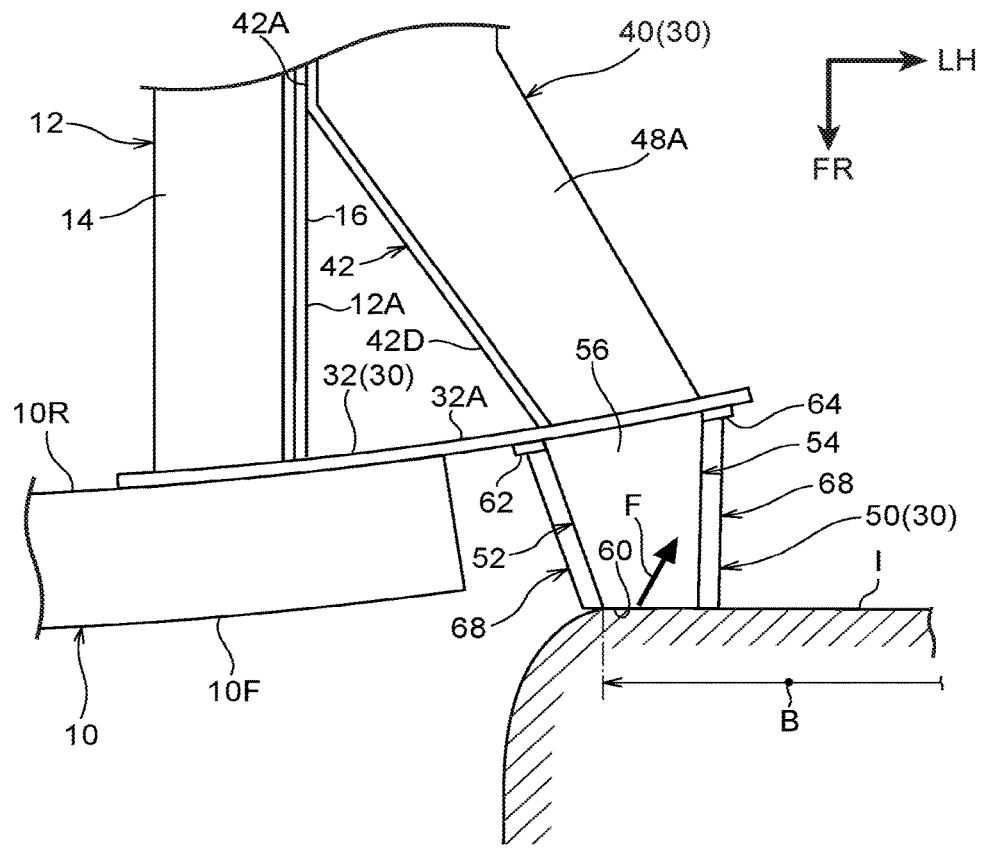

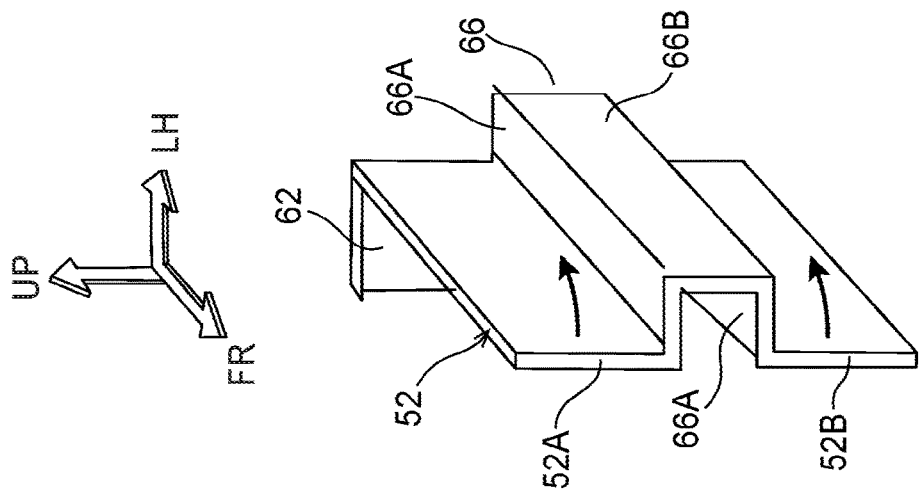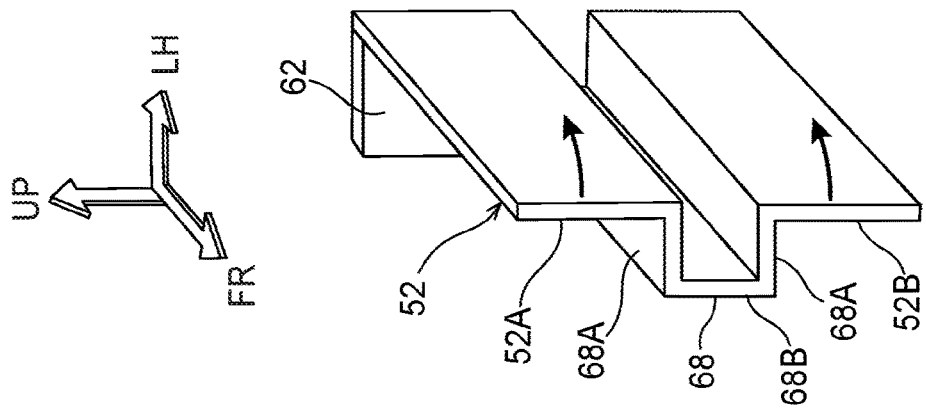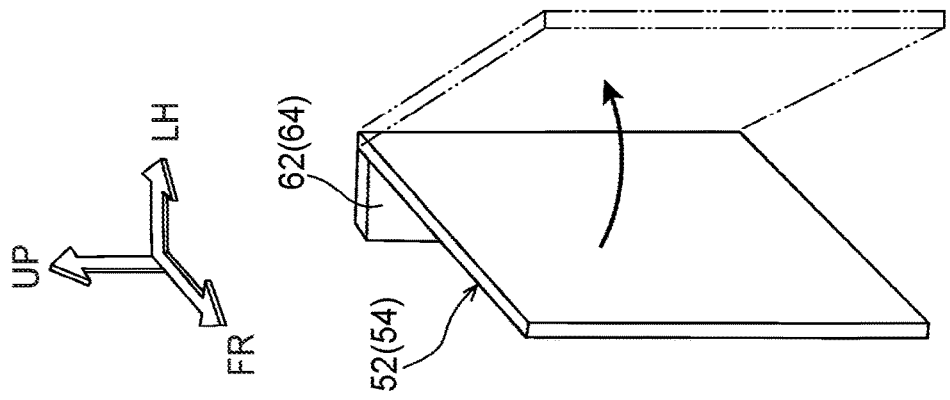

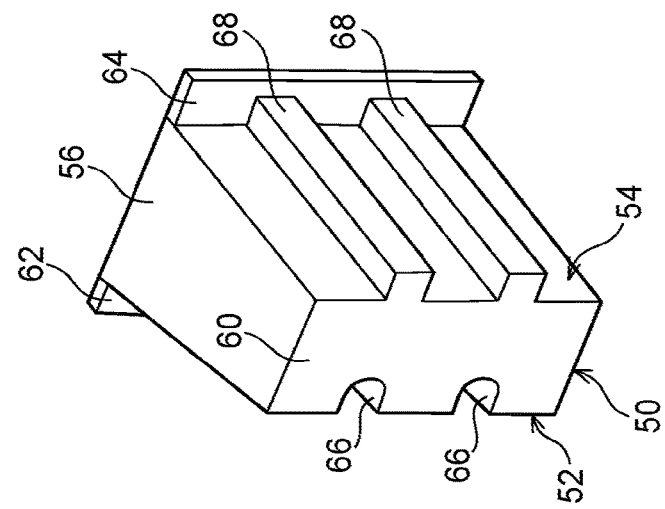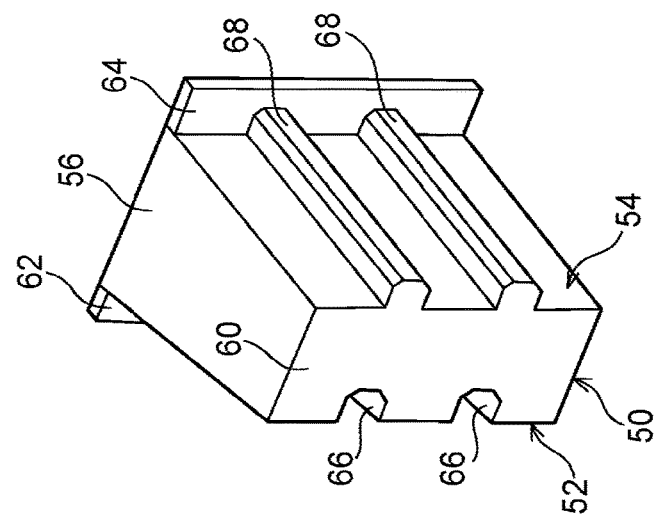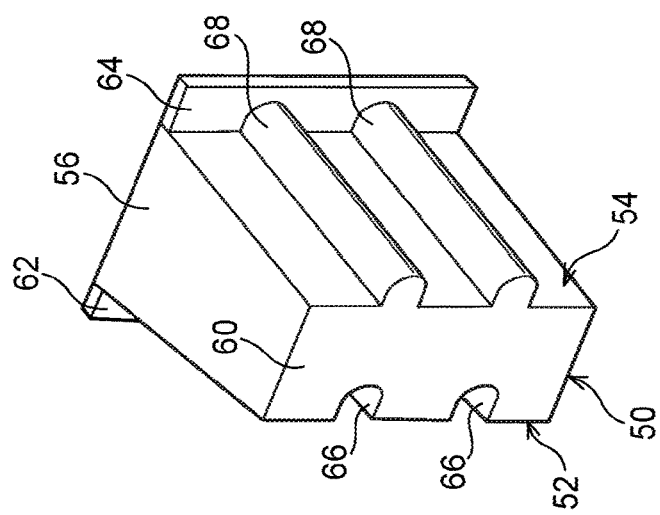

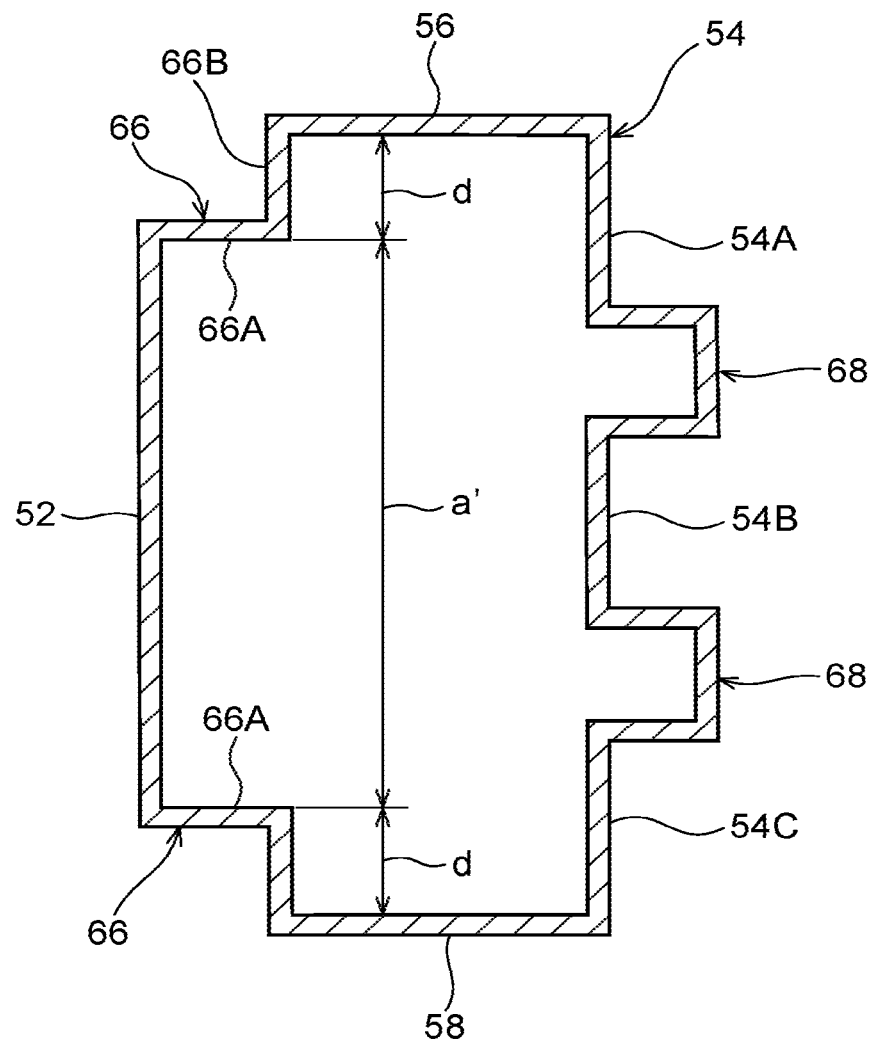

VEHICLE FRONT PORTION STRUCTURE

CROSS-REFERENCE TO RELATED APPLICATION

This application is based on and claims priority under 35 USC 119 from Japanese Patent Application No. 2015-176707 filed on Sep. 8, 2015, which is incorporated by reference herein in its entirety.

BACKGROUND

Technical Field

The present invention relates to a vehicle front portion structure.

Related Art

In a vehicle front portion structure recited in Japanese Patent Application Laid-Open (JP-A) No. 2012-062017 (Patent Document 1), an energy-absorbing member is provided at a front face of a vehicle width direction outer side end portion of a bumper reinforcement. Consequently, when there is an impact at the vehicle width direction outer side end portion of the bumper reinforcement, collision energy may be absorbed by the energy-absorbing member deforming.

In a micro-wrap collision of a vehicle (a frontal collision of the vehicle in which, for example, as defined by IIHS, a wrap amount of an impact body in the vehicle width direction is not more than 25%), the impact body may collide with the vehicle width direction outer side of the bumper reinforcement. In these circumstances, a spacer may be provided at the vehicle width direction outer side of a front side member, a collision load may be transmitted through the spacer to the front side member, and collision energy may be effectively absorbed by the front side member being deformed in the vehicle longitudinal direction.

However, when the above-described spacer is provided, a front side portion of the spacer (a front side spacer) is disposed at the vehicle width direction outer side relative to the front side member. Therefore, at the beginning of a micro-wrap collision of the vehicle, the front side portion of the spacer (the front side spacer) tends to be deformed by the impact body to tilt toward the vehicle width direction outer side. In this situation, a load transmission efficiency of the spacer (the front side spacer) to the front side member deteriorates, and it is possible that the front side member may not deform excellently in the vehicle longitudinal direction.

SUMMARY

In consideration of the circumstances described above, an object of the present invention is to provide a vehicle front portion structure that may suppress a deterioration in a load transmission efficiency of a front side spacer during a micro-wrap collision.

A vehicle front portion structure according to a first aspect of the present invention includes: a bumper reinforcement that extends in a vehicle width direction at a front end portion of a vehicle; a front side member that extends in the vehicle longitudinal direction, a front end portion of the front side member being joined to a vehicle width direction outer side portion of the bumper reinforcement; a protruding portion provided integrally with, or as a separate body at, a rear wall of the bumper reinforcement, the protruding portion protruding to the vehicle width direction outer side from a vehicle width direction outer side end of the bumper reinforcement; a front side spacer provided at the protruding portion, the front side spacer projecting to the vehicle front side from the protruding portion; a rear side spacer provided at a side wall at the vehicle width direction outer side of the front side member, the rear side spacer being disposed at the vehicle rear side of the protruding portion; one or a plurality of a first bead formed at an inner side wall that structures a side wall at the vehicle width direction inner side of the front side spacer, the each first bead extending in the vehicle longitudinal direction and projecting to the vehicle width direction outer side from the inner side wall; and one or a plurality of a second bead formed at an outer side wall that structures a side wall at the vehicle width direction outer side of the front side spacer, the each second bead extending in the vehicle longitudinal direction and projecting to the vehicle width direction outer side from the outer side wall, wherein an overall dimension in the vertical direction of a general portion of the inner side wall at which the first bead is not formed is specified to be larger than an overall dimension in the vertical direction of the one or plurality of first bead, and an overall dimension in the vertical direction of a general portion of the outer side wall at which the second bead is not formed is specified to be larger than an overall dimension in the vertical direction of the one or plurality of second bead.

BRIEF DESCRIPTION OF DRAWINGS

FIG. 3 is a partially sectioned plan view showing the vehicle left side region of the front end portion of the vehicle that is shown in FIG. 2.

FIG. 4 is a plan view for describing an initial state in a micro-wrap collision between a vehicle in which a vehicle front portion structure in accordance with a first comparative example is employed and an impact body.

FIG. 5A is a sectional diagram, seen from a vehicle front side, for describing a front side spacer that is used in a vehicle front portion structure in accordance with a second comparative example.

FIG. 5B is a plan view for describing an initial state in a micro-wrap collision between a vehicle in which the vehicle front portion structure in accordance with the second comparative example is employed and an impact body.

FIG. 7A is a perspective view for describing a tilting deformation of an inner side wall of the front side spacer in accordance with the first comparative example.

FIG. 7B is a perspective view for describing a tilting deformation of an inner side wall of the front side spacer in accordance with the second comparative example.

FIG. 7C is a perspective view for describing suppression of a tilting deformation of an inner side wall of the front side spacer in accordance with the present embodiment.

FIG. 8A is a perspective view showing a first variant example of first beads and second beads that are shown in FIG. 2.

FIG. 8B is a perspective view showing a second variant example of the first beads and second beads that are shown in FIG. 2.

FIG. 8C is a perspective view showing a third variant example of the first beads and second beads that are shown in FIG. 2.

FIG. 9 is a sectional view, corresponding to FIG. 1, showing an example in which locations and a number of first beads that are shown in FIG. 1 are modified.

DETAILED DESCRIPTION

Figure 1:
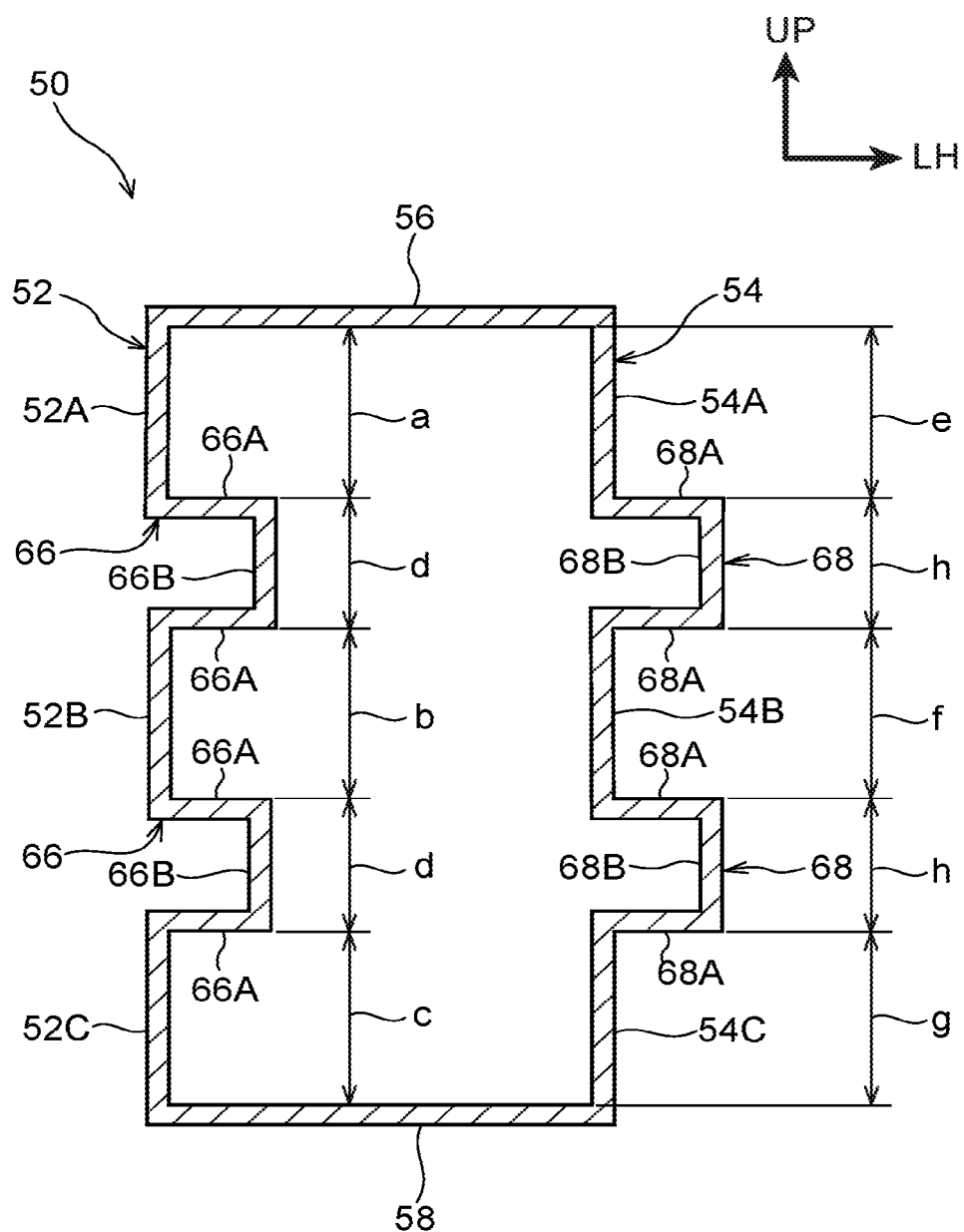
FIG. 1 is a sectional diagram, seen from a vehicle front side (a magnified sectional diagram taken along line 1-1 in FIG. 3), showing a front side spacer that is used in a vehicle front portion structure in accordance with a present embodiment.

Below, a vehicle (an automobile) V in which a vehicle front portion structure S according to an embodiment of the present invention is employed is described using the attached drawings. An arrow FR that is shown as appropriate in the drawings indicates a vehicle front side, an arrow UP indicates a vehicle upper side, and an arrow LH indicates a vehicle left side (one vehicle width direction side). Herebelow, where descriptions are given simply using the directions front, rear, up, down, left and right, unless otherwise specified, these represent the front and rear in the vehicle longitudinal direction, up and down in the vehicle vertical direction, and left and right in the lateral direction.

The vehicle front portion structure S is employed at each of two vehicle width direction side portions of a front end portion of the vehicle V. The vehicle front portion structures S are structured symmetrically between left and right in the vehicle width direction. Accordingly, in the following descriptions a left side region of the front end portion of the vehicle V is described; descriptions of a right side region of the front end portion of the vehicle V are not given.

Figure 2:
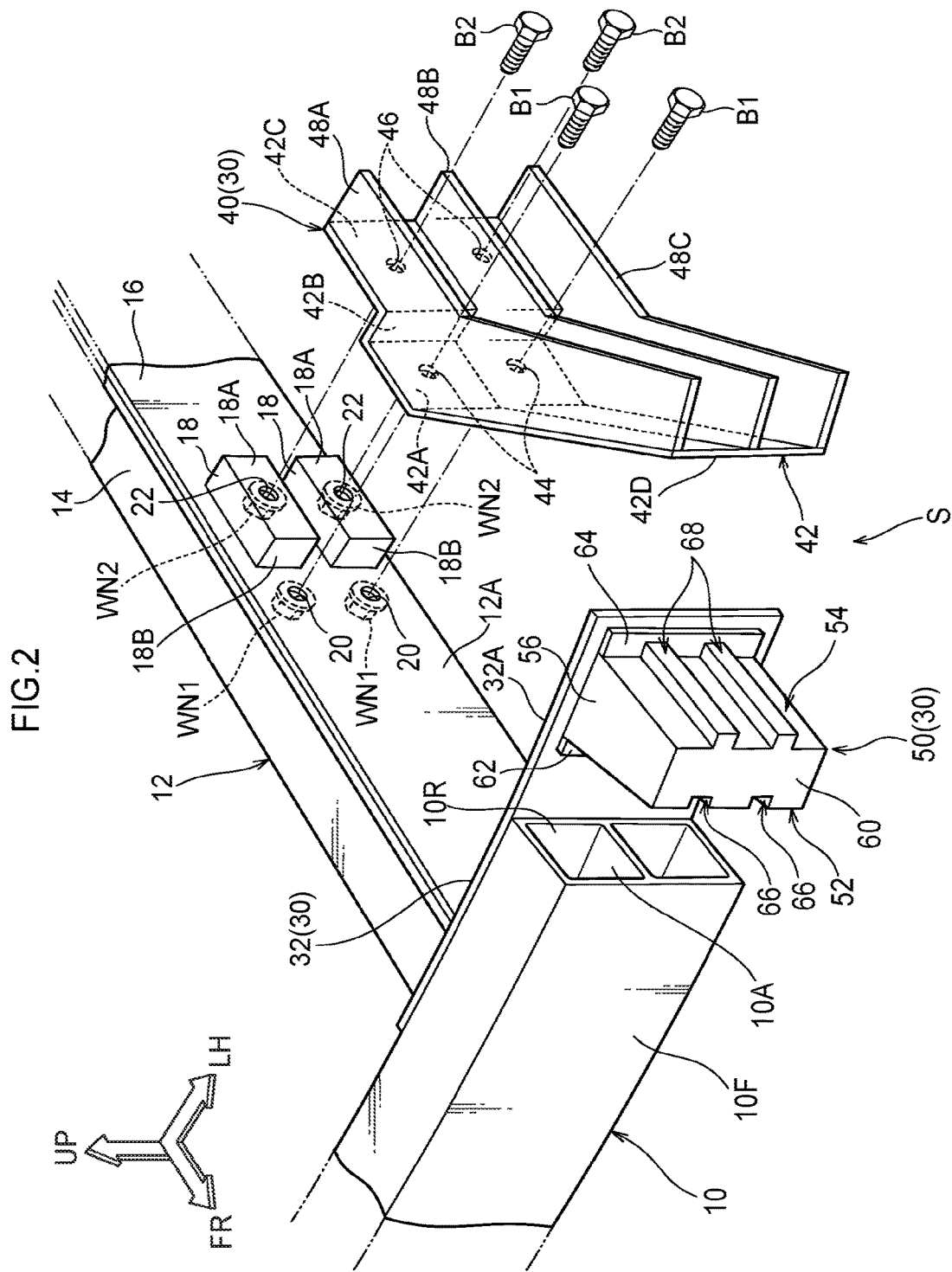
FIG. 2 is a schematic exploded perspective view, seen diagonally from the vehicle front-left, showing a vehicle left side region of a front end portion of the vehicle in which the vehicle front portion structure according to the present embodiment is employed, in a state in which a rear side spacer is detached.

As shown in FIG. 2 and FIG. 3, the vehicle V includes a bumper reinforcement 10 (below referred to as "the bumper RF 10"), a front side member 12 (below referred to as "the FS member 12") and a spacer 30. The respective structures of these are described below.

The Bumper RF 10

The bumper RF 10 is formed in a hollow, substantially rectangular column shape, and is disposed with a length direction thereof in the vehicle width direction. The bumper RF 10 is constituted of, for example, a metal material based on aluminium or the like, and is fabricated by a method such as extrusion molding or the like. A plate-shaped reinforcing plate 10A (see FIG. 2) is provided inside the bumper RF 10. The reinforcing plate 10A is disposed with a plate thickness direction thereof in the vertical direction. The reinforcing plate 10A links a front wall 10F with a rear wall 10R of the bumper RF 10. A cross-sectional structure of the bumper RF 10 is a cross-sectional structure in which a plural number (two in the present embodiment) of cross sections with substantially rectangular shapes are arrayed in the vertical direction (see FIG. 2). The bumper RF 10 may be formed by applying press-machining to steel plate or the like.

The FS Member 12

The FS member 12 extends in the longitudinal direction at the rear side of a vehicle width direction outer side region of the bumper RF 10. A front end portion of the FS member 12 is joined to the rear wall 10R of the bumper RF 10 via a linking plate 32, which is described below. Accordingly, a vehicle width direction outer side end portion of the bumper RF 10 projects to the vehicle width direction outer side beyond the FS member 12. The FS member 12, viewed in the length direction thereof, is formed in a substantially rectangular closed cross section shape. Specifically, the FS member 12 includes an inner panel 14 that structures a vehicle width direction inner side portion of the FS member 12 and an outer panel 16 that structures a vehicle width direction outer side portion of the FS member 12. The inner panel 14, seen in a front view, is formed substantially in a hat shape that opens to the vehicle width direction outer side. The outer panel 16 is formed in a substantial plate shape, and is disposed with the plate thickness direction thereof in the vehicle width direction. The outer panel 16 is joined by spot welding or the like to upper and lower flanges of an opening portion of the inner panel 14. Thus, an outer side wall 12A that forms a side wall at the vehicle width direction outer side of the FS member 12 is structured by the outer panel 16.

A pair of projection portions 18 are integrally formed at the outer side wall 12A at a front end portion of the FS member 12. The projection portions 18 project to the vehicle width direction outer side. The pair of projection portions 18, seen in a side view, are formed in substantially rectangular shapes with length directions thereof in the longitudinal direction, and are disposed to be arrayed in the vertical direction. In a sectional plan view, each projection portion 18 is formed in a recess shape that opens to the vehicle width direction inner side (see FIG. 2). Specifically, as shown in FIG. 2, the projection portion 18 includes an outer wall 18A, a front wall 18B and a rear wall 18C. The outer wall 18A is disposed with a plate thickness direction thereof in the vehicle width direction. The front wall 18B is inflected substantially perpendicularly toward the vehicle width direction inner side from a front end of the outer wall 18A, and the rear wall 18C is inflected substantially perpendicularly toward the vehicle width direction inner side from a rear end of the outer wall 18A.

As shown in FIG. 3, a pair of upper and lower first weld nuts WN1 that are for fastening a rear side spacer 40, which is described below, are fixed to the inner side face of the outer side wall 12A of the FS member 12. The first weld nuts WN1 are disposed at respective front sides of the projection portions 18, and are disposed to be arrayed in the vertical direction. A pair of upper and lower first insertion holes 20 with circular shapes are formed to penetrate through the outer side wall 12A. The first insertion holes 20 are disposed to be coaxial with the first weld nuts WN1.

Second weld nuts WN2 that are for fastening the rear side spacer 40 described below are fixed to inner side faces of the respective outer walls 18A of the projection portions 18, at front side portions of the outer walls 18A. The second weld nuts WN2 are disposed to be arrayed in the vertical direction. Second insertion holes 22 with circular shapes are formed to penetrate through the outer walls 18A of the projection portions 18. The second insertion holes 22 are disposed to be coaxial with the second weld nuts WN2.

The Spacer 30

The spacer 30 is provided at the vehicle width direction outer side of the front end portion of the FS member 12 and extends in the longitudinal direction as a whole. The spacer 30 includes the rear side spacer 40, which structures a rear side region of the spacer 30, a front side spacer 50, which structures a front side region of the spacer 30, and the linking plate 32, which serves as a protruding portion that is for linking the rear side spacer 40 with the front side spacer 50.

Below, the linking plate 32 is described first, and then the rear side spacer 40 and front side spacer 50 are described.

The linking plate 32 is structured of a metal plate member or the like and is disposed with a plate thickness direction thereof substantially in the longitudinal direction. Specifically, the linking plate 32 is disposed adjacent to a rear face of the bumper RF 10 (the rear wall 10R) and, in a state in which a vehicle width direction inner side end portion of the linking plate 32 is sandwiched between the bumper RF 10 and the front end portion of the FS member 12, the vehicle width direction inner side end portion of the linking plate 32 is joined to both the bumper RF 10 and the front end portion of the FS member 12. Thus, the front end portion of the FS member 12 is joined to the bumper RF 10 via the linking plate 32. Accordingly, the meaning of the recitation "a front end portion of the front side member being joined to a vehicle width direction outer side portion of the bumper reinforcement" of the present invention encompasses structures in which the front end portion of the front side member is joined to the vehicle width direction outer side region of the bumper reinforcement via another member.

A vehicle width direction outer side portion of the linking plate 32 is projected to the vehicle width direction outer side relative to a vehicle width direction outer side end of the bumper RF 10. That is, the linking plate 32 is provided at the rear wall 10R of the bumper RF 10 and protrudes to the vehicle width direction outer side beyond the vehicle width direction outer side end of the bumper RF 10. This protruding region serves as a linking portion 32A. The rear side spacer 40 and front side spacer 50 that are described below are linked by the linking portion 32A.

The rear side spacer 40 is formed by joining (connecting) plural plates and is formed in a substantial "E" shape in a front view. Specifically, the rear side spacer 40 includes a first plate 42 that structures a wall portion at the vehicle width direction inner side of the rear side spacer 40 and a plural number (three in the present embodiment) of second plates 48A, 48B and 48C that protrude to the vehicle width direction outer side from the first plate 42 (see FIG. 2).

The first plate 42 extends in the longitudinal direction as a whole, with a plate thickness direction thereof substantially in the vehicle width direction. A rear portion of the first plate 42 is inflected substantially in a crank shape in plan view and is disposed adjacent to the vehicle width direction outer sides of the outer side wall 12A and pair of projection portions 18 of the FS member 12. Specifically, the first plate 42 includes a middle side wall portion 42A at the front side of the pair of projection portions 18, which abuts against (an outer side face of) the outer side wall 12A of the FS member 12, and an engaging wall portion 42B at the front side of the pair of projection portions 18, which protrudes to the vehicle width direction outer side from the rear end of the middle side wall portion 42A. The first plate 42 further includes a rear end side wall portion 42C that protrudes to the rear side from the vehicle width direction outer side end of the engaging wall portion 42B. The rear end side wall portion 42C abuts against the outer walls 18A of the projection portions 18.

An upper and lower pair of circular first fastening holes 44 are formed to penetrate through the middle side wall portion 42A. Bolts B1 are inserted into the first fastening holes 44 and the first insertion holes 20 from the vehicle width direction outer side, and the bolts B1 are screwed into the first weld nuts WN1. Thus, the middle side wall portion 42A is fixed by fastening to the outer side wall 12A of the FS member 12.

An upper and lower pair of circular second fastening holes 46 are formed to penetrate through the rear end side wall portion 42C. Bolts B2 are inserted into the second fastening holes 46 and the second insertion holes 22 from the vehicle width direction outer side, and the bolts B2 are screwed into the second weld nuts WN2. Thus, the rear end side wall portion 42C is fixed by fastening to the outer walls 18A of the projection portions 18.

To be specific, when a predetermined collision load toward the rear side is inputted to the front end portion of the rear side spacer 40 that is described below, the fastening state between the rear side spacer 40 and the FS member 12 by the bolts B1 and the bolts B2 is disengaged, and the rear side spacer 40 is relatively displaced toward the rear side with respect to the FS member 12. For example, the rear side spacer 40 (the first plate 42) is structured to have a higher mechanical strength than a mechanical strength of the bolts B1 and bolts B2. As a result of the predetermined collision load, the bolts B1 (and bolts B2) are pressed by inner periphery faces of the first fastening holes 44 (and second fastening holes 46), and the bolts B1 (and bolts B2) are broken. Thus, the fastening state between the rear side spacer 40 and the FS member 12 is disengaged.

The engaging wall portion 42B is disposed to be separated to the front side from the front walls 18B of the projection portions 18. Thus, a gap G (see FIG. 3) is formed between the engaging wall portion 42B and the front walls 18B of the projection portions 18. The engaging wall portion 42B and the front walls 18B of the projection portions 18 are disposed to be parallel in a plan sectional view, opposing one another in the longitudinal direction. Thus, a structure is formed such that, when the predetermined collision load toward the rear side is inputted to the front end portion of the rear side spacer 40 and the fastening state between the rear side spacer 40 and the FS member 12 is disengaged, the engaging wall portion 42B and the front walls 18B of the projection portions 18 engage in the longitudinal direction, and the front walls 18B of the projection portions 18 take up the rear side spacer 40 from the rear side thereof.

As shown in FIG. 3, a front portion of the first plate 42 serves as a front side side wall portion 42D. In plan view, the front side side wall portion 42D is angled to the vehicle width direction outer side toward the front side from the front end of the middle side wall portion 42A. That is, a boundary region between the front side side wall portion 42D and the middle side wall portion 42A is inflected, and the front side side wall portion 42D separates toward the vehicle width direction outer side from the FS member 12 toward the front side. A front end portion of the front side side wall portion 42D is disposed at the vehicle width direction outer side relative to the vehicle width direction outer side end of the bumper RF 10. The front end portion of the front side side wall portion 42D is joined to the rear face of the linking portion 32A of the linking plate 32.

As shown in FIG. 2, the second plates 48A to 48C extend in the longitudinal direction with plate thickness directions thereof in the vertical direction. The second plates 48A to 48C are disposed to be arrayed with predetermined spaces therebetween in the vertical direction. Vehicle width direction inner side end portions of the second plates 48A to 48C are formed to correspond with the inflected shape of the first plate 42, and are connected to the outer side face of the first plate 42 by welding or the like. Specifically, the second plates 48A and 48C that are disposed above and below are respectively joined to upper and lower ends of the first plate 42 by welding or the like, and protrude to the vehicle width direction outer side from the first plate 42. The second plate 48B that is disposed in the middle in the vertical direction is joined to a vertical direction central portion of the first plate 42 by welding or the like and protrudes to the vehicle width direction outer side from the first plate 42. Head portions of the above-mentioned bolts B1 and bolts B2 are disposed between the second plate 48A and second plate 48B and between the second plate 48B and second plate 48C. Further, as shown in FIG. 3, front ends of the second plates 48A to 48C are joined to the rear face of the linking plate 32.

Now, the front side spacer 50, which is a principal portion of the present invention, is described. As shown in FIG. 2 and FIG. 3, the front side spacer 50 is disposed at the vehicle width direction outer side of the bumper RF 10, at the front side of the linking portion 32A of the linking plate 32. The front side spacer 50 is fabricated of metal and is formed in a substantially rectangular tube shape with a floor that opens to the rear side. That is, the front side spacer 50 is formed with a closed cross section structure (see FIG. 1). A side wall at the vehicle width direction inner side of the front side spacer 50 is an inner side wall 52, and a side wall at the vehicle width direction outer side of the front side spacer 50 is an outer side wall 54. A flange 62 is formed integrally at a rear end portion of the inner side wall 52. The flange 62 protrudes to the vehicle width direction inner side from the rear end portion of the inner side wall 52 and is joined to the front face of the linking plate 32 by welding or the like. A flange 64 is formed integrally at a rear end portion of the outer side wall 54. The flange 64 protrudes to the vehicle width direction outer side from the rear end portion of the outer side wall 54 and is joined to the front face of the linking plate 32 by welding or the like. Respective rear end portions of an upper wall 56 and a lower wall 58 of the front side spacer 50 (see FIG. 1) are also joined to the front face of the linking plate 32 by welding or the like. Therefore, the front side spacer 50 projects toward the front side from the linking plate 32 at a location at the vehicle width direction outer side relative to the bumper RF 10. A front end portion of the front side spacer 50 is a front wall 60. The front end of the front side spacer 50 is closed off by the front wall 60.

A width dimension (a dimension in the lateral direction) of the front side spacer 50 is specified to be smaller toward the front side thereof. Specifically, the inner side wall 52 is disposed to be slightly angled toward the vehicle width direction outer side toward the front side in plan view, and the outer side wall 54 is disposed to be slightly angled toward the vehicle width direction inner side toward the front side in plan view. As shown in FIG. 3, the width dimension at the rear end portion of the front side spacer 50 and a width dimension of the front end portion of the rear side spacer 40 are specified to be substantially equal, and a lateral position of the rear end portion of the front side spacer 50 is specified to substantially coincide with a lateral position of the front end portion of the rear side spacer 40. That is, the rear end portion of the front side spacer 50 and the front end portion of the rear side spacer 40 are disposed so as to coincide in the longitudinal direction in plan view. In addition, a projection amount of the front side spacer 50 from the linking plate 32 is specified such that a front face of the front side spacer 50 is coplanar with a front face of the bumper RF 10 in plan view.

As shown in FIG. 1, a pair of upper and lower first beads 66 are formed at a vertical direction middle portion of the inner side wall 52. The first beads 66 extend in the longitudinal direction from the front end of the inner side wall 52 to the flange 62, and are disposed to be separated by a predetermined spacing in the vertical direction. In a sectional view seen from the front side, each first bead 66 is formed in a recess shape that opens to the vehicle width direction inner side, and projects to the vehicle width direction outer side relative to the inner side wall 52 (i.e., is indented). Specifically, the first bead 66 includes a pair of upper and lower side walls 66A whose plate thickness directions are in the vertical direction and a floor wall 66B whose plate thickness direction is in the vehicle width direction and that links vehicle width direction outer side end portions of the pair of side walls 66A. Thus, the inner side wall 52 is divided up (partitioned) by the pair of upper and lower first beads 66. The divided inner side wall 52 serves as general portions 52A, 52B and 52C.

Vertical dimensions of the general portions 52A, 52B and 52C of the inner side wall 52 are a dimension a, a dimension b and a dimension c, respectively. The vertical dimensions a to c are specified to be respectively the same. A vertical dimension d of each first bead 66 (i.e., a vertical dimension of the floor wall 66B) is specified to be smaller than the vertical dimensions a to c. Therefore, an overall dimension in the vertical direction of the general portions 52A to 52C of the inner side wall 52 at which the first beads 66 are not formed (that is, a sum of the vertical dimensions a to c) is specified to be larger than an overall dimension in the vertical direction of the first beads 66 (a sum of the vertical dimensions d of the pair of first beads 66). That is, an overall dimension in the vertical direction of the general portions 52A to 52C of the inner side wall 52 is specified to be more than half of the vertical dimension of the front side spacer 50.

Correspondingly, a pair of upper and lower second beads 68 are formed at a vertical direction middle portion of the outer side wall 54. The second beads 68 extend in the longitudinal direction from the front end of the outer side wall 54 to the flange 64, and are disposed to be separated by a predetermined spacing in the vertical direction. In the sectional view seen from the front side, each second bead 68 is formed in a recess shape that opens to the vehicle width direction inner side, and projects to the vehicle width direction outer side relative to the outer side wall 54. Specifically, the second bead 68 includes a pair of upper and lower side walls 68A whose plate thickness directions are in the vertical direction and a top wall 68B whose plate thickness direction is in the vehicle width direction and that links vehicle width direction outer side end portions of the pair of side walls 68A. Thus, the outer side wall 54 is divided up (partitioned) by the pair of upper and lower second beads 68. The divided outer side wall 54 serves as general portions 54A, 54B and 54C.

Vertical dimensions of the general portions 54A, 54B and 54C of the outer side wall 54 are a dimension e, a dimension f and a dimension g, respectively. The vertical dimensions e to g are specified to be the same. A vertical dimension h of each second bead 68 (i.e., a vertical dimension of the top wall 68B) is specified to be smaller than the vertical dimensions e to g. Therefore, an overall dimension in the vertical direction of the general portions 54A to 54C of the outer side wall 54 at which the second beads 68 are not formed (that is, a sum of the vertical dimensions e to g) is specified to be larger than an overall dimension in the vertical direction of the second beads 68 (a sum of the dimensions h of the pair of second beads 68). That is, an overall dimension in the vertical direction of the general portions 54A to 54C of the outer side wall 54 is specified to be more than half of the vertical dimension of the front side spacer 50.

The vertical dimension d of each first bead 66 is specified to be the same as the vertical dimension h of each second bead 68, and vertical positions of the first beads 66 coincide with vertical positions of the second beads 68. Thus, the vertical dimensions a to c of the general portions 52A to 52C of the inner side wall 52 are specified to be the same as the vertical dimensions e to g of the general portions 54A to 54C of the outer side wall 54.

Operation and Effects

Now, operation and effects of the present embodiment are described through comparison with vehicle front portion structures of first to third comparative examples, which are illustrated below. In the vehicle front portion structures according to the first to third comparative examples, members other than the front side spacer 50 have the same structures as in the present embodiment. In the following descriptions of the first to third comparative examples, for convenience, descriptions are given with the same reference symbols being applied as in the present embodiment.

First, the first comparative example is described. As illustrated in FIG. 4, in the front side spacer 50 according to the first comparative example, the first beads 66 according to the present embodiment are omitted from the inner side wall 52 and the second beads 68 according to the present embodiment are omitted from the outer side wall 54. Thus, the inner side wall 52 and the outer side wall 54 are formed in flat plate shapes in the first comparative example.

According to the first comparative example, when the vehicle V has a micro-wrap collision with an impact body I (a barrier), the impact body I impacts against the front wall 60 of the front side spacer 50 and a collision load toward the rear side is inputted to the front side spacer 50. Consequently, a collision load toward the rear side is inputted through the linking plate 32 to the front end portion of the rear side spacer 40. Because the impact body I does not impact against the vehicle width direction central side of the vehicle V, the vehicle V relatively moves toward the front side with respect to the impact body I. Because the front end portion of the rear side spacer 40 is disposed to be offset to the vehicle width direction outer side relative to the location of fixing of the rear side spacer 40 to the FS member 12, in response to relative movement of the vehicle V with respect to the impact body I, the rear side spacer 40 goes into a mode of principally turning in the direction of arrow A in FIG. 4 about the region of the second fastening holes 46 (see FIG. 3).

In this mode, a collision load F toward the rear side and the vehicle width direction outer side (diagonally to the left-rear side) acts on the front wall 60 of the front side spacer (and front ends of the inner side wall 52 and the outer side wall 54). Consequently, as shown in FIG. 7A, the inner side wall 52 and outer side wall 54 each deform to tilt to the vehicle width direction outer side about the rear end portions thereof. Hence, as shown by the two-dot chain lines in FIG. 4, the front side spacer 50 as a whole deforms to tilt toward the vehicle width direction outer side. As a result, a load transmission efficiency of the front side spacer 50 to the rear side spacer 40 (and the FS member 12) may deteriorate.

According to the first comparative example, in order to raise the load transmission efficiency of the front side spacer 50, it is necessary to raise the strengths of the inner side wall 52 and the outer side wall 54 (to reinforce the inner side wall 52 and the outer side wall 54) and raise deformation withstand loads (tilting deformation withstand loads) of the inner side wall 52 and outer side wall 54 with respect to the collision load F. If the inner side wall 52 and outer side wall 54 are to be reinforced while suppressing an increase in weight of the front side spacer 50, it is effective to provide beads for reinforcement at the inner side wall 52 and the outer side wall 54. In this case, it is common to provide beads that protrude to the width direction outer sides of the front side spacer 50 from the inner side wall 52 and outer side wall 54, so as to increase the cross-sectional area of the front side spacer. Accordingly, in the second comparative example as shown in FIG. 5A and FIG. 5B, in order to raise the deformation withstand loads of the inner side wall 52 and the outer side wall 54 according to the first comparative example, the second beads 68 are formed at the inner side wall 52 and at the outer side wall 54. Specifically, in the second comparative example, the pair of upper and lower second beads 68 that project to the width direction outer side of the front side spacer 50 are formed at each of the inner side wall 52 and the outer side wall 54 of the front side spacer 50. More specifically, the outer side wall 54 according to the second comparative example has the same structure as the outer side wall 54 according to the present embodiment. Thus, in the second comparative example, the inner side wall 52 and the outer side wall 54 are structured symmetrically between left and right in the vehicle width direction. The width dimension of the front side spacer 50 according to the second comparative example (the distance between the inner side wall 52 and the outer side wall 54) is specified to be the same as in the present embodiment.

In the second comparative example, because the second beads 68 project to the vehicle width direction inner side from the inner side wall 52, at the beginning of a micro-wrap collision of the vehicle V, a front face of an impact body I (the region indicated by arrow B in FIG. 5B) may not come up against the second beads 68 at the inner side wall 52. In this case, the second beads 68 formed at the inner side wall 52 may not function effectively.

Initially during a micro-wrap collision of the vehicle V, if a collision load F acts diagonally toward the rear-left side on the front end portion of the inner side wall 52, the inner side wall 52 and outer side wall 54 of the front side spacer 50 deform to tilt toward the vehicle width direction outer side about the rear end portions thereof in the same manner as described above. However, the second comparative example has a structure in which the second beads 68 are provided at each of the inner side wall 52 and the outer side wall 54, raising the strengths of the inner side wall 52 and the outer side wall 54. On the other hand, at the inner side wall 52 of the second comparative example, the second beads 68 are disposed at the vehicle width direction inner side relative to the inner side wall 52 (the general portions 52A to 52C). That is, as shown in FIG. 7B, the second beads 68 at the inner side wall 52 are disposed at the opposite side from the direction of tilting deformation of the general portions 52A to 52C of the inner side wall 52 (see the arrows in FIG. 7B). (FIG. 7B locally shows only the general portions 52A and 52B.) Therefore, the general portions 52A to 52C of the inner side wall 52 may not be supported by the second beads 68, and the second beads 68 may deform to tilt to the vehicle width direction outer side together with the general portions 52A to 52C of the inner side wall 52. As a result, in the second comparative example too, the load transmission efficiency from the front side spacer 50 to the FS member 12 may deteriorate.

Figure 6A:
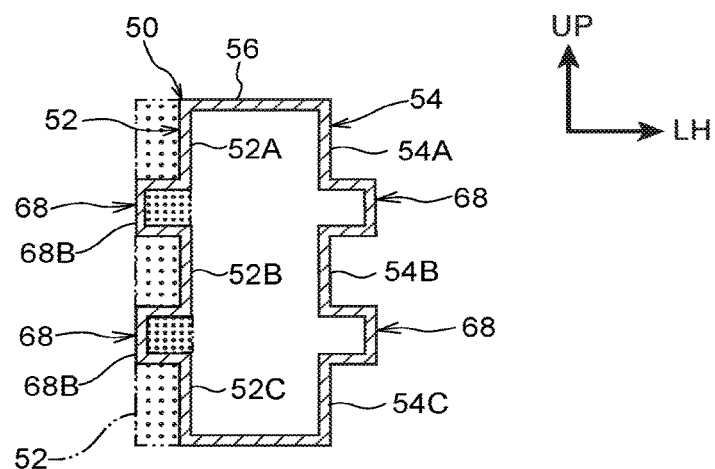
FIG. 6A is a sectional diagram, seen from a vehicle front side, for describing a front side spacer that is used in a vehicle front portion structure in accordance with a third comparative example.
Figure 6B:
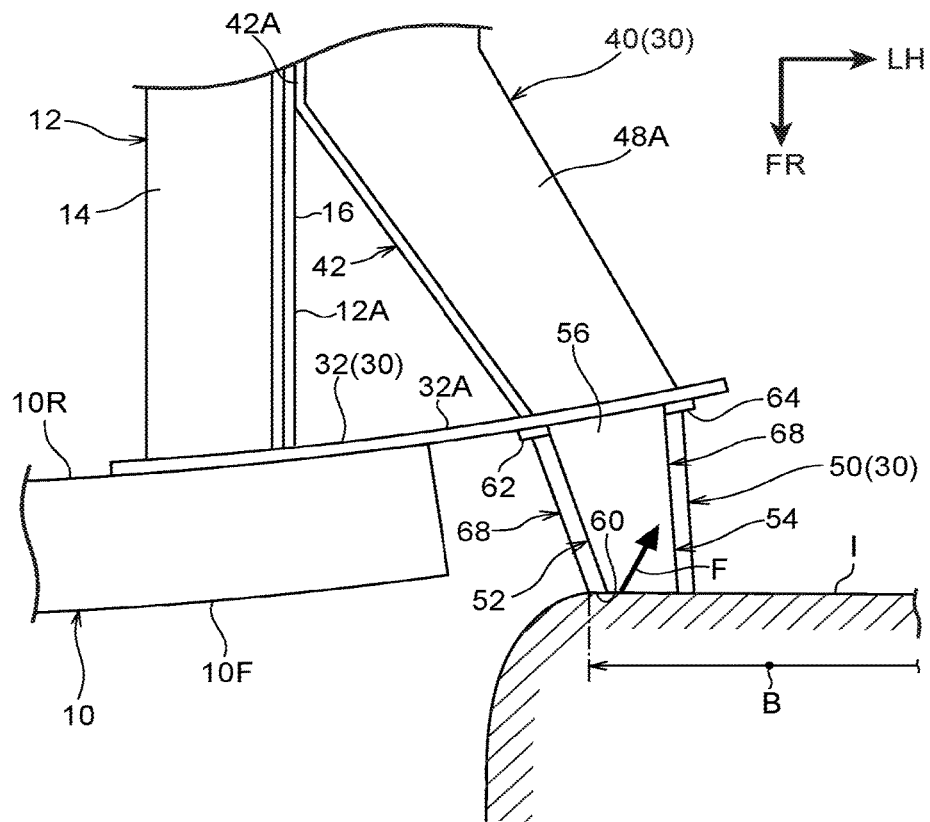
FIG. 6B is a plan view for describing an initial state in a micro-wrap collision between a vehicle in which the vehicle front portion structure in accordance with the third comparative example is employed and an impact body.

Now, the third comparative example is described. As shown in FIG. 6A and FIG. 6B, the front side spacer 50 according to the third comparative example is structured similarly to the second comparative example described above, but the width dimension of the front side spacer 50 (the distance between the inner side wall 52 and the outer side wall 54) is specified to be small compared to the present embodiment (and the second comparative example), such that the front face of an impact body I (the region indicated by arrow B in FIG. 6B) would come up against the second beads 68 at the inner side wall 52 at the beginning of a micro-wrap collision of the vehicle V. Specifically, a position in the vehicle width direction of the top wall 68B of each second bead 68 at the inner side wall 52 is specified so as to coincide with a position of the inner side wall 52 (the general portions 52A to 52C) according to the present embodiment (see the inner side wall 52 shown by two-dot chain lines in FIG. 6A).

In the third comparative example, at the beginning of a micro-wrap collision of the vehicle V, although the impact body I comes up against the second beads 68 of the inner side wall 52, a contact area with (the front face of) the impact body I at the vehicle width direction inner side end portion of the front side spacer 50 (see the region shown with high-density dots in FIG. 6A) is smaller than a non-contact region with the impact body I (see the region shown with low-density dots in FIG. 6A). Therefore, the second beads 68 of the inner side wall 52 would receive the collision load F locally at the vehicle width direction inner side end portion of the front side spacer 50, and a burden on these second beads 68 would be high. Consequently, the second beads 68 might deform.

Initially during the micro-wrap collision of the vehicle V, when a collision load F acts diagonally toward the rear-left side on the front end portion of the inner side wall 52, the inner side wall 52 deforms to tilt toward the vehicle width direction outer side about the rear end portion thereof in the same manner as described above. Similarly to the second comparative example, in the third comparative example the second beads 68 at the inner side wall 52 are disposed at the opposite side from the direction of tilting deformation of the general portions 52A to 52C of the inner side wall 52. Consequently, in the third comparative example too, the inner side wall 52 tends to deform to tilt to the vehicle width direction outer side about the rear end portion thereof, and the load transmission efficiency by the front side spacer to the FS member 12 may deteriorate.

In contrast to the first to third comparative examples described above, in the present embodiment as shown in FIG. 1, the pair of upper and lower first beads 66 that extend in the longitudinal direction are formed at the inner side wall 52 of the front side spacer 50, and each first bead 66 projects to the vehicle width direction outer side from the inner side wall 52. That is, in the present embodiment, as shown in FIG. 7C, the first beads 66 are disposed at the side toward which the general portions 52A to 52C of the inner side wall 52 deform to tilt (the arrowed side shown by two-dot chain lines in FIG. 7A) at the beginning of a micro-wrap collision of the vehicle V (FIG. 7C locally shows only the general portions 52A and 52B). Therefore, when a collision load F is inputted to the front end portion of the inner side wall 52 diagonally toward the rear-left side, the first beads 66 act so as to support the inner side wall 52 that is adjacent above and below (i.e., the general portions 52A to 52C). Hence, tilting deformation of the inner side wall 52 to the vehicle width direction outer side at the beginning of a micro-wrap collision of the vehicle V is suppressed.

In addition, the overall dimension in the vertical direction of the general portions 52A to 52C of the inner side wall 52 (the sum of the vertical dimensions a to c) is specified to be greater than the sum of the overall dimension in the vertical direction of the first beads 66 (the sum of the dimensions d of the pair of first beads 66). Therefore, tilting deformation of the whole inner side wall 52 including the first beads 66 to the vehicle width direction outer side may be substantially suppressed. That is, if the overall dimension in the vertical direction of the general portions 52A to 52C of the inner side wall 52 were specified to be smaller than the overall dimension in the vertical direction of the first beads 66, then the general portions 52A to 52C would function as beads and the first beads 66 would function as the inner side wall, in a similar manner to the second comparative example and third comparative example described above. In this case, the inner side wall 52 would tend to deform to tilt to the vehicle width direction outer side about the rear end portion thereof, similarly to the second comparative example and third comparative example described above. By contrast, in the present embodiment, because the overall dimension in the vertical direction of the general portions 52A to 52C of the inner side wall 52 is specified to be larger than the overall dimension in the vertical direction of the first beads 66 as described above, tilting deformation of the whole inner side wall 52 including the first beads 66 to the vehicle width direction outer side may be substantially suppressed.

Meanwhile, the pair of upper and lower second beads 68 that extend in the vehicle longitudinal direction are formed at the outer side wall 54 of the front side spacer 50, and each second bead 68 projects to the vehicle width direction outer side from the outer side wall 54. The overall dimension in the vertical direction of the general portions 54A to 54C of the outer side wall 54 (the sum of the vertical dimensions e to g) is specified to be greater than the overall dimension in the vertical direction of the second beads 68 (the sum of the dimensions h of the pair of second beads 68). Therefore, similarly to the inner side wall 52, at the beginning of a micro-wrap collision of the vehicle V, tilting deformation of the whole outer side wall 54 including the second beads 68 to the vehicle width direction outer side may be substantially suppressed.

Thus, according to the present embodiment, the projection direction of the first beads 66 from the inner side wall 52 and the projection direction of the second beads 68 from the outer side wall 54 are specified in consideration of a load direction of a collision load F that acts on the front side spacer 50. That is, the first beads 66 and second beads 68 are respectively disposed at the sides towards which the inner side wall 52 and the outer side wall 54 would be deformed to tilt by the collision load F. Therefore, a deformation withstand load of the front side spacer 50 with respect to the collision load F may be raised effectively. Thus, because tilting deformation of the front side spacer 50 as a whole toward the vehicle width direction outer side is suppressed, a collision load F that is inputted to the front side spacer 50 may be more efficiently transmitted through the rear side spacer 40 to the FS member 12 than in the first to third comparative examples.

When a collision load F is inputted from the front side spacer 50 to the rear side spacer 40, as described above, the rear side spacer 40 goes into the mode of principally turning about the region of the second fastening holes 46 (see the direction of arrow A in FIG. 4). In this mode, the rear end side wall portion 42C of the rear side spacer 40 acts so as to push the pair of projection portions 18 to the vehicle width direction inner side, and a load toward the vehicle width direction inner side is inputted from the rear end side wall portion 42C to the FS member 12. Here, because the bending strength of the FS member 12 in the vehicle width direction is raised by the pair of projection portions 18, bending of the FS member 12 so as to protrude to the vehicle width direction inner side is suppressed (i.e., the FS member 12 is more resistant to bending).

As shown in FIG. 3, the engaging wall portion 42B that is structured to be engageable in the longitudinal direction with the front walls 18B of the projection portions 18 is formed at the rear side spacer 40, at the front side of the projection portions 18. The fastening state between the rear side spacer 40 and the FS member 12 is disengaged by the collision load F that is inputted to the rear side spacer 40. Hence, the rear side spacer 40 is relatively displaced to the rear side with respect to the FS member 12 by the collision load F, and the engaging wall portion 42B of the rear side spacer 40 engages with the front walls 18B of the projection portions 18 in the longitudinal direction. Thus, the front walls 18B of the projection portions 18 take up the rear side spacer 40 from the rear side thereof, and the collision load F is transmitted through the projection portions 18 to the FS member 12. As a result, the FS member 12 is compressively deformed in the longitudinal direction by the collision load F transmitted to the FS member 12. Therefore, collision energy during a micro-wrap collision of the vehicle V may be absorbed effectively.

In the present embodiment, because the respective vertical dimensions a to c of the general portions 52A to 52C of the inner side wall 52 are specified to be larger than the vertical dimension d of each first bead 66, as well as strength of the inner side wall 52 being raised, tilting deformation of the inner side wall 52 to the vehicle width direction outer side at the beginning of a micro-wrap collision of the vehicle V may be suppressed effectively. Further, because the respective vertical dimensions e to g of the general portions 54A to 54C of the outer side wall 54 are specified to be larger than the vertical dimension h of each second bead 68, similarly to the inner side wall 52, as well as strength of the outer side wall 54 being raised, tilting deformation of the outer side wall 54 to the vehicle width direction outer side at the beginning of a micro-wrap collision of the vehicle V may be suppressed effectively. Therefore, tilting deformation of the front side spacer 50 to the vehicle width direction outer side at the beginning of a micro-wrap collision of the vehicle V may be suppressed effectively.

In the present embodiment, the vertical dimension d of the pair of first beads 66 formed at the inner side wall 52 is specified to be the same as the vertical dimension h of the pair of second beads 68 formed at the outer side wall 54, and the vertical positions of the first beads 66 coincide with the vertical positions of the second beads 68. Therefore, when an impact body I comes up against the front side spacer 50, the impact body I may be taken up by the front side spacer 50 in a well-balanced manner. Therefore, a difference in load between a collision load acting on the inner side wall 52 and a collision load acting on the outer side wall 54 may be suppressed from becoming large. As a result, the collision load may be dispersed in the front side spacer 50 and the collision load may be transmitted to the rear side spacer.

In the present embodiment, the front side spacer 50 and the rear side spacer 40 are linked via the linking plate 32. Therefore, a collision load F inputted to the front side spacer 50 may be promptly transmitted to the rear side spacer 40.

In the present embodiment, the front end portion of the rear side spacer 40 and the rear end portion of the front side spacer 50 are linked by the linking plate 32. Therefore, positional accuracy of a vertical position of the front end portion of the rear side spacer 40 and a vertical position of the front side spacer 50 may be raised.

In the present embodiment, the first beads 66 formed at the inner side wall 52 of the front side spacer 50 and the second beads 68 formed at the outer side wall 54 are respectively formed in rectangular recess shapes in cross-section that are open to the vehicle width direction inner side. However, cross-sectional shapes of the first beads 66 and the second beads 68 are not limited thus. For example, as shown in FIG. 8A, the cross-sectional shapes of the first beads 66 and the second beads 68 may be "U" shapes that are open to the vehicle width direction inner side (a first variant example). Further, as shown in FIG. 8B, the cross-sectional shapes of the first beads 66 and the second beads 68 may be polygonal shapes that are open to the vehicle width direction inner side (a second variant example). As shown in FIG. 8C, the cross-sectional shapes of the first beads 66 and the second beads 68 may be respectively different shapes (a third variant example).

In the present embodiment, the pair of first beads 66 are formed at the inner side wall 52 and the pair of second beads 68 are formed at the outer side wall 54. The vertical dimension d of each first bead 66 and the vertical dimension h of each second bead 68 are specified to be the same, and the vertical positions of the first beads 66 coincide with the vertical positions of the second beads 68. However, numbers, vertical dimensions and vertical positions of the first beads 66 and the second beads 68 may be respectively arbitrarily specified. That is, the numbers, vertical dimensions and vertical positions of the first beads 66 (and second beads 68) can be arbitrarily specified as long as the overall dimension of the general portions of the inner side wall 52 (the outer side wall 54) is larger than the overall dimension in the vertical direction of the first beads 66 (the second beads 68). For example, as shown in FIG. 9, two of the first beads 66 may be formed at the inner side wall 52 to be located at an upper end portion at the upper side wall and a lower end portion of the inner side wall 52. In this case, the vertical dimension d of each first bead 66 is the distance from the upper wall 56 of the front side spacer 50 to the side wall 66A of the first bead 66 and the distance from the lower wall 58 of the front side spacer 50 to the side wall 66A of the first bead 66.

In the present embodiment, the front end portion of the rear side spacer 40 is joined to the linking plate 32, but structures are possible in which the front end portion of the rear side spacer 40 is not joined to the linking plate 32. A gap may be formed between the front end portion of the rear side spacer 40 and the linking plate 32. In this case, during a micro-wrap collision of the vehicle V, the linking portion 32A of the linking plate 32 displaces to the rear side and comes into contact with the front end portion of the rear side spacer 40. Hence, a collision load is transmitted to the rear side spacer 40.

In the present embodiment, the linking plate 32 is structured as a separate body from the bumper RF 10, but the linking plate 32 may be structured integrally with the bumper RF 10. For example, the rear wall 10R of the bumper RF 10 may protrude to the vehicle width direction outer side beyond the vehicle width direction outer side end of the bumper RF 10 and this protruding portion may serve as a linking portion.

In the present embodiment, the rear side spacer 40 is structured by the first plate 42 and the three second plates 48A to 48C, but modes of the rear side spacer 40 are not limited thus. For example, the rear side spacer 40 may be formed in a solid shape. In this case, a structure is possible in which countersinks are formed that open to the vehicle width direction outer side and into which the bolts B1 and bolts B2 are inserted, with the first fastening holes 44 and second fastening holes 46 being formed in floor walls of the countersinks.

As a further example, a front wall portion that inflects to the vehicle width direction inner side may be formed at a front end portion of the first plate 42 of the rear side spacer

40, a rear wall portion that inflects to the vehicle width direction inner side may be formed at a rear end portion of the first plate 42, and the front wall portion and rear wall portion may be respectively joined to the front ends and rear ends of the second plates 48A to 48C.

As a further example, a plate that connects between each of the second plates 48A to 48C may be added at a length direction middle portion of the rear side spacer 40.

In the present embodiment, the pairs of upper and lower first weld nuts WN1 and second weld nuts WN2 are fixed to the outer panel 16 of the FS member 12. Thus, a structure is formed in which the rear side spacer 40 is fastened to the FS member 12 by the bolts B1 and the bolts B2 being screwed into the first weld nuts WN1 and the second weld nuts WN2, respectively. Alternatively, a structure is possible in which bolts projecting to the vehicle width direction outer side are fixed to the outer panel 16 of the FS member 12, and the rear side spacer 40 is fastened to the FS member 12 by nuts being screwed onto these bolts.

In the present embodiment, the vehicle front portion structure S is employed at both of vehicle width direction end portions of the front end portion of the vehicle V. However, the vehicle front portion structure S may be employed at either one of the vehicle left side portion and the vehicle right side portion of the front end portion of the vehicle V. In this case, a structure that is different from the vehicle front portion S may be formed at the other of the vehicle left side portion and the vehicle right side portion of the front end portion of the vehicle V.

In a vehicle front portion structure with the structure according to the first aspect, the bumper reinforcement extends in the vehicle width direction at the front end portion of the vehicle, and the front end portion of the front side member that extends in the vehicle longitudinal direction is joined to the vehicle width direction outer side portion of the bumper reinforcement.

The protruding portion is provided integrally or as a separate body at the rear wall of the bumper reinforcement, and protrudes to the vehicle width direction outer side from the vehicle width direction outer side end of the bumper reinforcement. The front side spacer is provided at the protruding portion. The front side spacer is projected to the vehicle front side from the protruding portion. The rear side spacer is provided at the side wall at the vehicle width direction outer side of the front side member. The rear side spacer is disposed at the vehicle rear side of the protruding portion. Therefore, when there is a micro-wrap collision of the vehicle, when an impact body impacts against the front side spacer, a collision load is transmitted through the protruding portion and the rear side spacer to the front side member.

The single or plural first bead extending in the vehicle longitudinal direction is formed at the inner side wall that structures the side wall at the vehicle width direction inner side of the front side spacer. Each first bead projects toward the vehicle width direction outer side from the inner side wall. Therefore, each general portion of the inner side wall, at which the first bead is not formed, is supported from the vehicle width direction outer side thereof by the first bead(s). Consequently, when an impact body impacts against the front side spacer, tilting deformation of the general portion(s) of the inner side wall toward the vehicle width direction outer side is suppressed. Moreover, the overall dimension in the vertical direction of the general portion(s) of the inner side wall is specified to be larger than the overall dimension in the vertical direction of the first bead(s). Therefore, tilting deformation of the whole inner side wall including the first bead(s) toward the vehicle width direction outer side may be substantially suppressed.

The single or plural second bead extending in the vehicle longitudinal direction is formed at the outer side wall that structures the side wall at the vehicle width direction outer side of the front side spacer. Each second bead projects toward the vehicle width direction outer side from the outer side wall. Moreover, the overall dimension in the vertical direction of the general portion(s) of the outer side wall is specified to be larger than the overall dimension in the vertical direction of the second bead(s). Therefore, similarly to the inner side wall described above, when the impact body impacts against the front side spacer, tilting deformation of the whole inner side wall including the second bead(s) toward the vehicle width direction outer side may be effectively suppressed. Thus, because tilting deformation of the front side spacer to the vehicle width direction outer side is suppressed, a collision load inputted to the front side spacer may be efficiently transmitted through the rear side spacer to the front side member.

In a vehicle front portion structure according to a second aspect of the present invention, in the invention according to the first aspect, a front wall portion of the rear side spacer is joined to the protruding portion.

In a vehicle front portion structure with the structure described above, because the front end portion of the rear side spacer is joined to the protruding portion, a collision load inputted to the front side spacer may be promptly transmitted to the rear side spacer.

In a vehicle front portion structure according to a third aspect of the present invention, in the invention according to the first or second aspect, a vertical dimension of each general portion of the inner side wall is specified to be larger than a vertical dimension of each first bead, and a vertical dimension of each general portion of the outer side wall is specified to be larger than a vertical dimension of each second bead.

In a vehicle front portion structure with the structure described above, strengths of the inner side wall and the outer side wall may be raised while tilting deformation of the inner side wall and the outer side wall toward the vehicle width direction outer side when there is a micro-wrap collision of the vehicle may be effectively suppressed.

In a vehicle front portion structure according to a fourth aspect of the present invention, in the invention according to any one of the first to third aspects, numbers of the first bead and the second bead are equal, and vehicle vertical positions of the first bead and the second bead coincide.

In a vehicle front portion structure with the structure described above, when an impact body impacts against the front side spacer, the impact body may be taken up by the front side spacer in a well-balanced manner. Therefore, a difference in load between a collision load acting on the inner side wall and a collision load acting on the outer side wall may be suppressed from becoming large. As a result, the collision load may be dispersed in the front side spacer and the collision load may be transmitted to the rear side spacer.

According to a vehicle front portion structure in accordance with the first aspect, a deterioration in the load transmission efficiency of the front side spacer during a micro-wrap collision may be suppressed.

According to a vehicle front portion structure in accordance with the second aspect, a collision load inputted to the front side spacer may be promptly transmitted to the rear side spacer.

According to a vehicle front portion structure in accordance with the third aspect, while strengths of the inner side wall and the outer side wall are raised, tilting deformation of the inner side wall and the outer side wall toward the vehicle width direction outer side when there is a micro-wrap collision of the vehicle may be effectively suppressed.

According to a vehicle front portion structure in accordance with the fourth aspect, a collision load may be dispersed in the front side spacer and the collision load may be transmitted to the rear side spacer.

What is claimed is:

1. A vehicle front portion structure comprising:
   a bumper reinforcement that extends in a vehicle width direction at a front end portion of a vehicle;
   a front side member that extends in the vehicle longitudinal direction, a front end portion of the front side member being joined to a vehicle width direction outer side portion of the bumper reinforcement;
   a protruding portion provided integrally with, or as a separate body at, a rear wall of the bumper reinforcement, the protruding portion protruding to the vehicle width direction outer side from a vehicle width direction outer side end of the bumper reinforcement;
   a front side spacer provided at the protruding portion, the front side spacer projecting to the vehicle front side from the protruding portion;
   a rear side spacer provided at a side wall at the vehicle width direction outer side of the front side member, the rear side spacer being disposed at the vehicle rear side of the protruding portion;
   one or a plurality of a first bead formed at an inner side wall that structures a side wall at the vehicle width direction inner side of the front side spacer, the each first bead extending in the vehicle longitudinal direction and projecting to the vehicle width direction outer side from the inner side wall; and
   one or a plurality of a second bead formed at an outer side wall that structures a side wall at the vehicle width direction outer side of the front side spacer, the each second bead extending in the vehicle longitudinal direction and projecting to the vehicle width direction outer side from the outer side wall,
   wherein an overall dimension in the vertical direction of a general portion of the inner side wall at which the first bead is not formed is specified to be larger than an overall dimension in the vertical direction of the one or plurality of first bead, and an overall dimension in the vertical direction of a general portion of the outer side wall at which the second bead is not formed is specified to be larger than an overall dimension in the vertical direction of the one or plurality of second bead.

2. The vehicle front portion structure according to claim 1, wherein a front wall portion of the rear side spacer is joined to the protruding portion.

3. The vehicle front portion structure according to claim 2, wherein a vertical dimension of each general portion of the inner side wall is specified to be larger than a vertical dimension of each first bead, and a vertical dimension of each general portion of the outer side wall is specified to be larger than a vertical dimension of each second bead.

4. The vehicle front portion structure according to claim 2, wherein numbers of the first bead and the second bead are equal, and vehicle vertical positions of the first bead and the second bead coincide.

5. The vehicle front portion structure according to claim 1, wherein a vertical dimension of each general portion of the inner side wall is specified to be larger than a vertical dimension of each first bead, and a vertical dimension of each general portion of the outer side wall is specified to be larger than a vertical dimension of each second bead.

6. The vehicle front portion structure according to claim 5, wherein numbers of the first bead and the second bead are equal, and vehicle vertical positions of the first bead and the second bead coincide.

7. The vehicle front portion structure according to claim 1, wherein numbers of the first bead and the second bead are equal, and vehicle vertical positions of the first bead and the second bead coincide.

* * * * *